Figure 15:
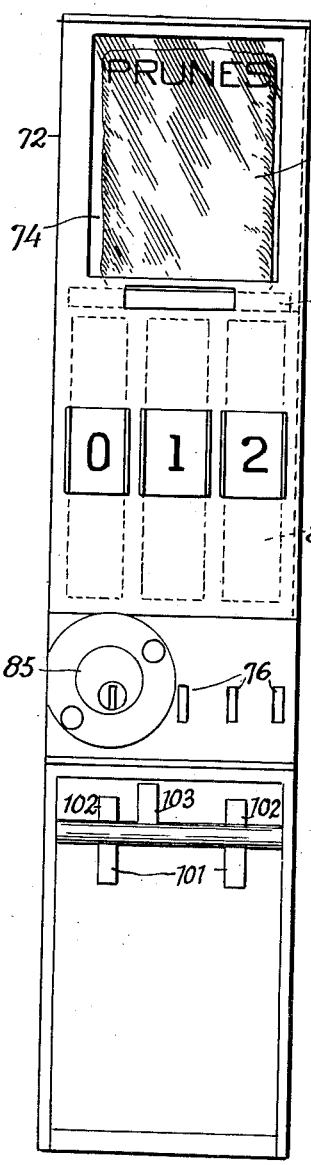

Aug. 23, 1938.	S. ESGRÓ	2,127,769
MERCHANDISE DISPENSING SYSTEM
Filed April 1, 1935	5 Sheets-Sheet 1
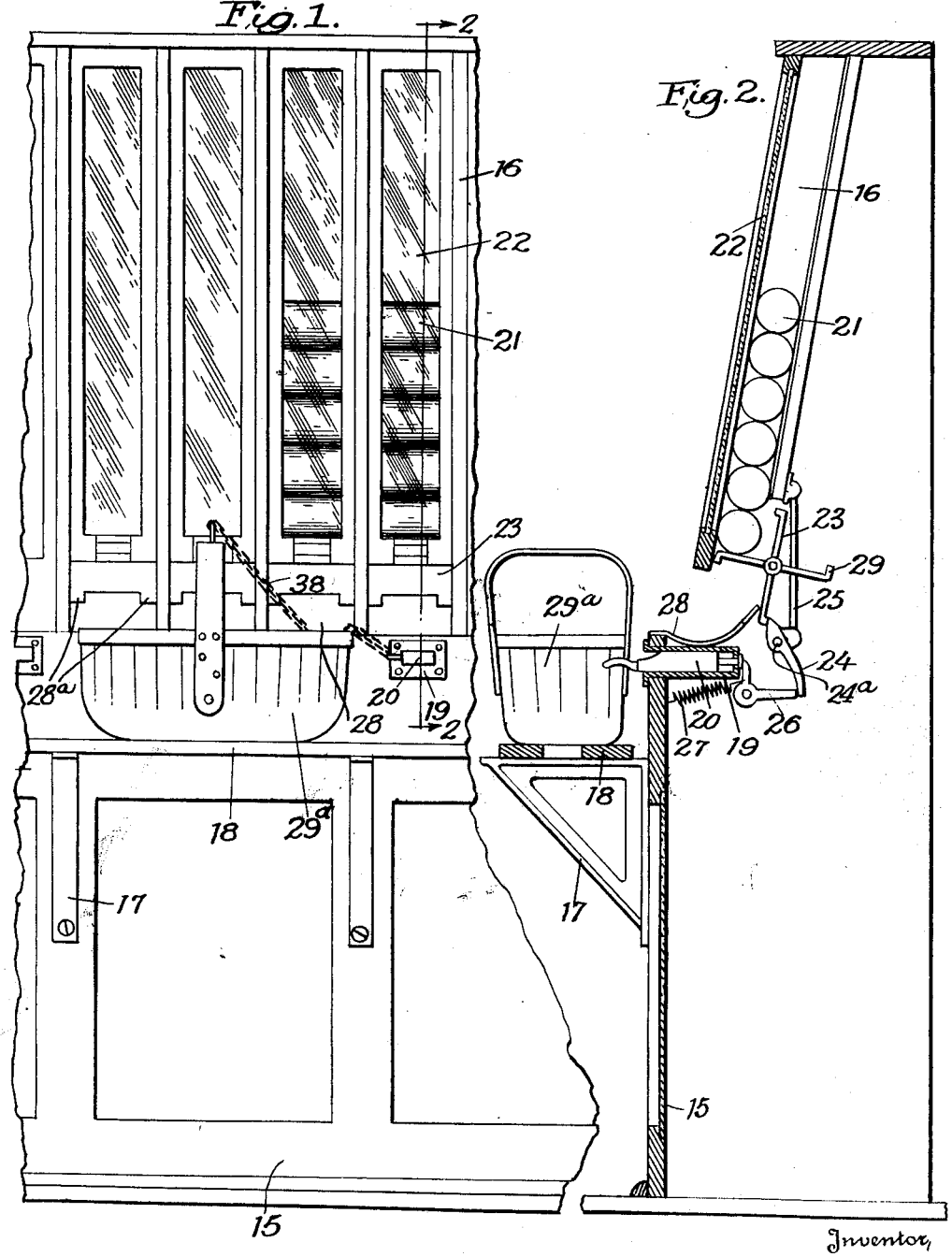
Inventor,
Sam Esgro,
By John W. Farley
Attorney.

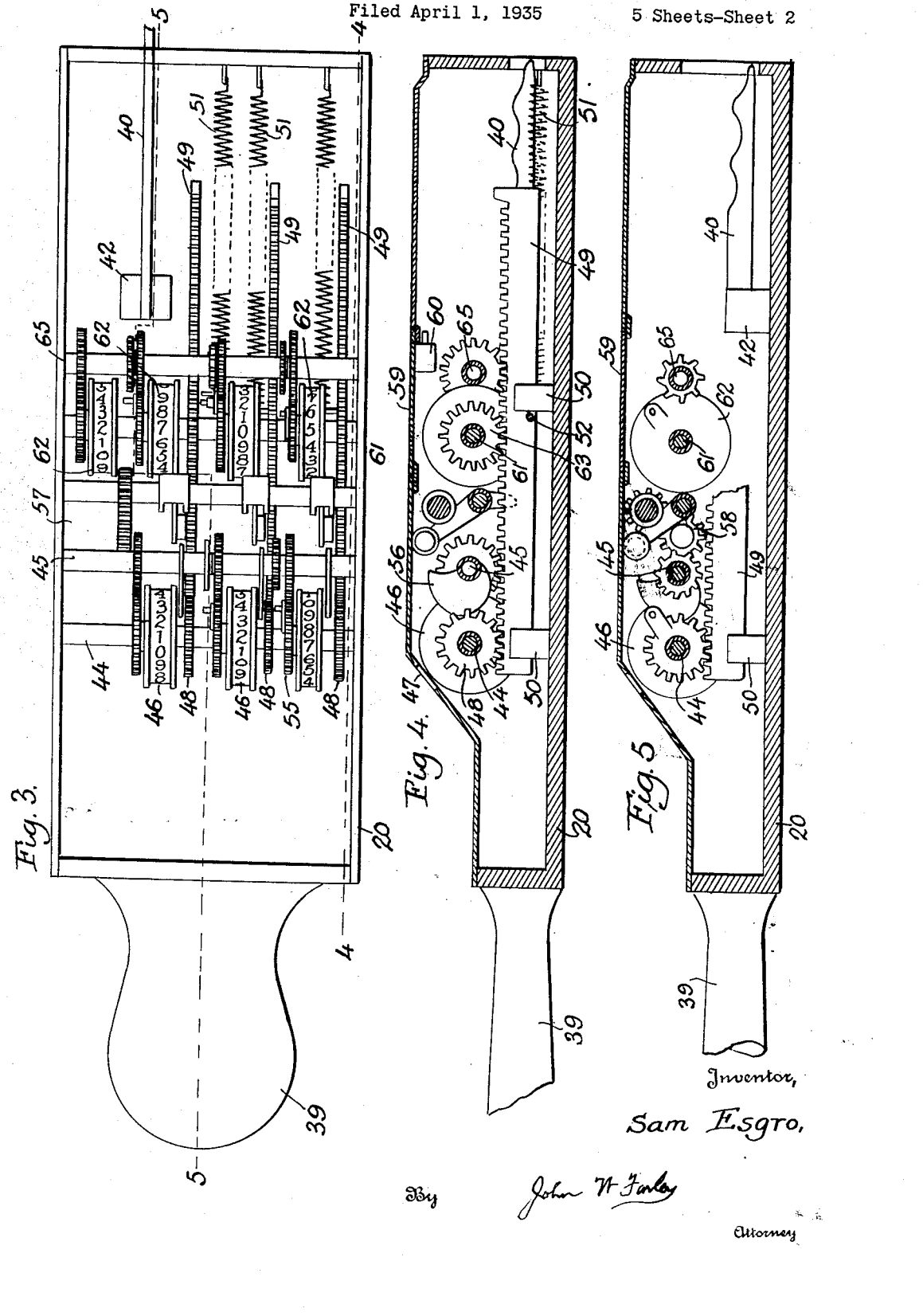

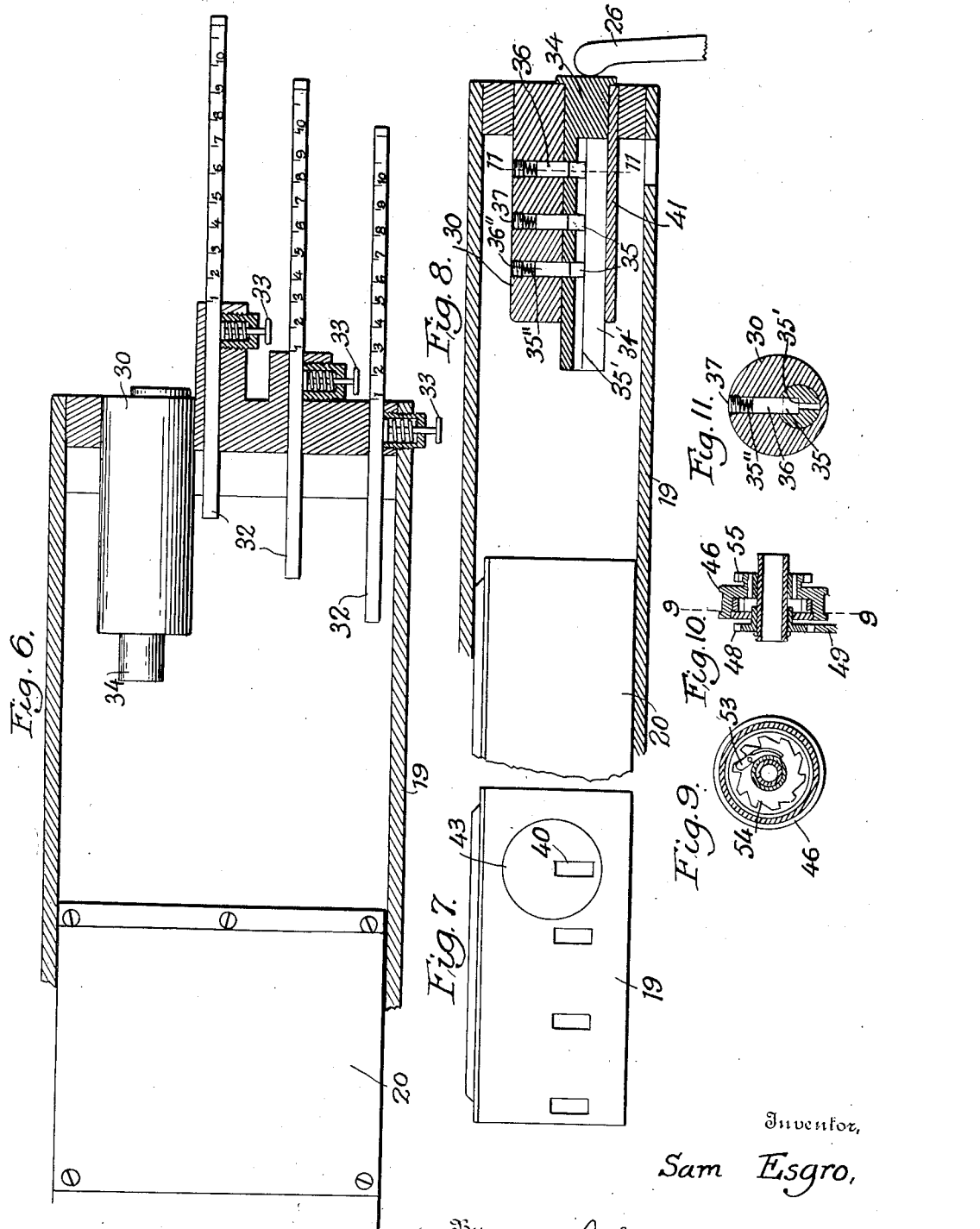

Aug. 23, 1938.   S. ESGRÓ   2,127,769
MERCHANDISE DISPENSING SYSTEM
Filed April 1, 1935   5 Sheets-Sheet 4
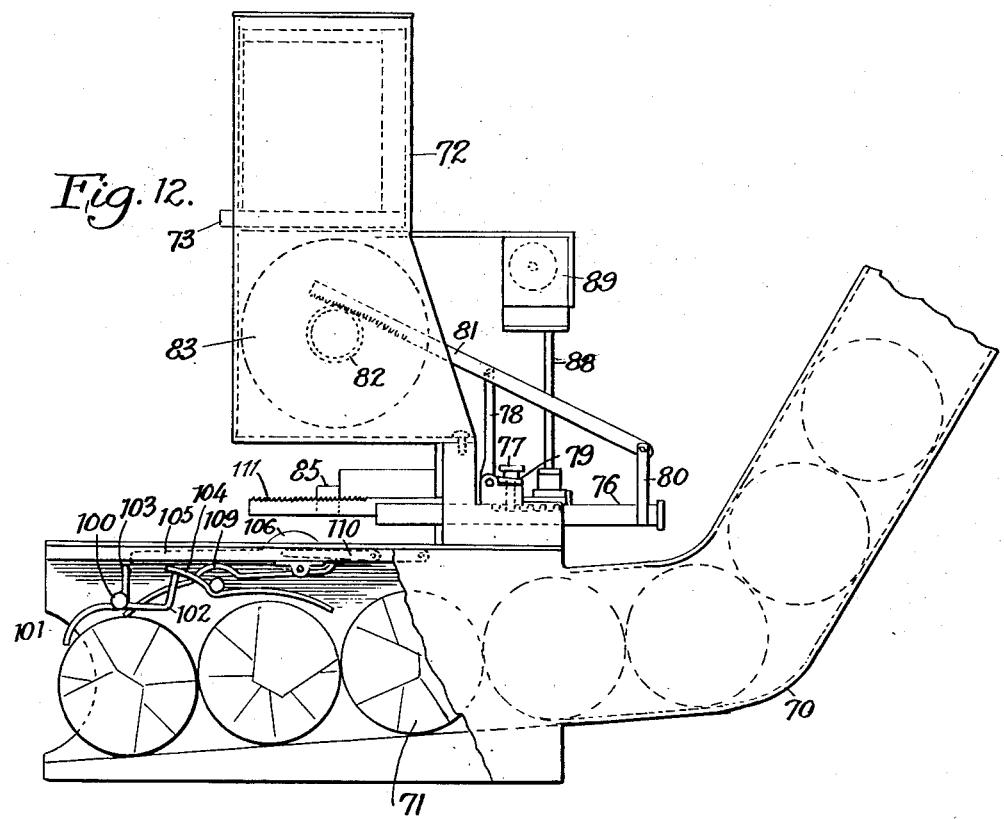
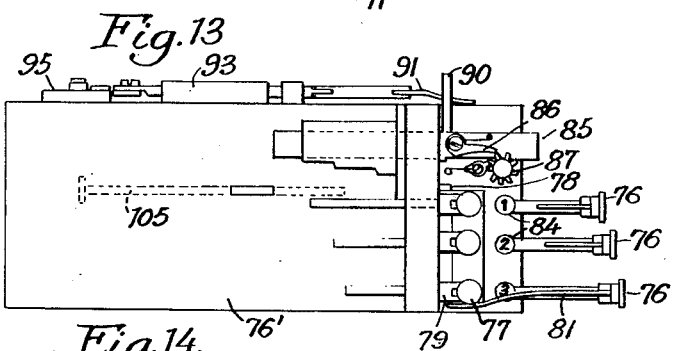
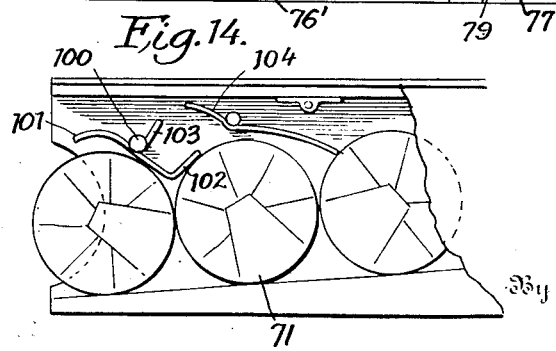
Inventor,
Sam Esgro,
John W. Farley
Attorney Aug. 23, 1938.  S. ESGRÓ  2,127,769
MERCHANDISE DISPENSING SYSTEM
Filed April 1, 1935  5 Sheets-Sheet 5

Inventor,
Sam Esgro.
By John W. Farley
Attorney

Patented Aug. 23, 1938

2,127,769

UNITED STATES PATENT OFFICE 2,127,769

MERCHANDISE DISPENSING SYSTEM

Sam Esgró, Memphis, Tenn., assignor of forty-nine one-hundredths to Charles Arthur Jean Mrs. Charles W. Jean, and Ralph Nelson Jean, Memphis, Tenn.

Application April 1, 1935, Serial No. 14,184

21 Claims. (Cl. 235—1)

My invention relates to merchandising or vending means for use in a self-serving store and it is an object of the invention to provide means whereby a customer who has collected his purchases from the stock in the store shall also automatically be provided with a statement of the aggregate cost of such purchases, which statement is not open to question by either the customer or the cashier of the store.

A further object is to provide convenient means whereby the total daily sales can be arrived at by a store manager or proprietor quickly and accurately and independently of the actual cash receipts, whereby also he can determine whether the cash receipts are correct.

It is an advantage of my device that it prevents not only genuine mistakes but also a form of petty thievery prevalent especially in chain stores where adding machines are used by the clerks, who cheat customers by adding another item on the machine over and above the number of articles actually purchased and pocket the amount of that item. With my device there can only be one addition for each item, and neither is it possible to secure any article of merchandise without registering the same on the device hereinafter described, thus protecting both the customer and the proprietor of the store. At the same time it dispenses with the need of adding machines and cash registers and saves the time of the cashier or clerk.

Figure 16:
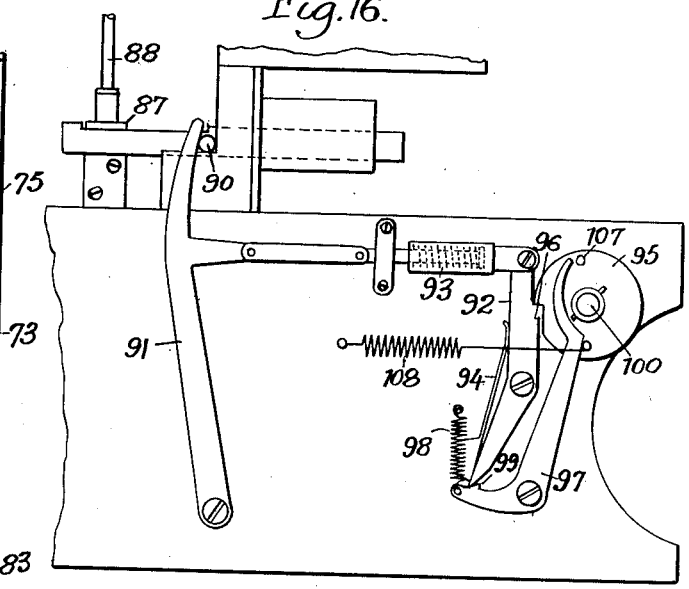

Referring to the drawings, which are made a part of this application and in which similar reference characters indicate similar parts:

Fig. 1 is an elevation of a portion of a vending apparatus,

Fig. 2, a vertical section of the same on line 2—2, Fig. 1,

Fig. 3, a plan of a key forming part of the apparatus,

Fig. 4, a section on line 4—4 of Fig. 3,

Fig. 5, a section on line 5—5 of Fig. 3,

Fig. 6, an enlarged plan of a part shown in Fig. 1,

Fig. 7, an end view of a key also shown in said figure,

Fig. 8, a vertical section of parts shown in Fig. 6,

Fig. 9, a section on line 9—9 of Fig. 10,

Fig. 10, a vertical section of a number wheel shown in Fig. 3,

Fig. 11, a section on line 11—11, Fig. 8,

Fig. 12, a side elevation, partly in section, of a modified form of my invention, Fig. 13, a plan of key-operated devices, Fig. 14, a detail of a view showing another position for certain parts appearing in Fig. 12, Fig. 15, a front view showing certain parts of Fig. 12 on a larger scale, and Fig. 16, an elevation of the opposite end of the mechanism shown in Fig. 12.

In the drawings, reference character 15 indicates a supporting frame for a series of merchandise containers 16, said frame also carrying a series of brackets 17 for a shelf or ledge 18, a casing 19 for receiving a key 20, and controlling mechanism for the articles in the containers 16.

The merchandise containers are here shown as being in the form of chutes from which articles of merchandise 21 are fed by gravity, these chutes being provided with glass panels 22 through which the contents may be viewed by customers. At the bottom of each chute there is a controlling mechanism comprising a rotary separator 23, normally held against rotation by a detent 24 pivoted on a fixed support 25. The detent 24 is held against movement by a trip 26 pivotally mounted on a fixed support. It will be seen that when the trip 26 is moved clockwise against the tension of its spring 27, the detent 24 is released and the separator 23 is free to rotate so as to permit the lowermost article in the chute to fall on a curved track 28 and either roll into a basket 29a supported on ledge 18, or be picked up by the customer and transferred to the basket. The separator 23 has arms with fingers 29 at their ends so located and proportioned that as the lowermost article is released a finger will enter between that article and the next in line, so as to hold up the remaining articles in the chute. The track is notched at 28a to permit passage of the lower finger-carrying parts of the blades of separator 23.

Details of the casing 19 are shown in Figs. 6, 7, 8 and 11. As seen from Fig. 7 the casing is preferably rectangular in cross section to provide a passage for a key of similar shape. At the end next to the trip 26 the casing is provided with a round opening for a plug 30 and with a series of rectangular openings for rods 32 here shown at being three in number, although this and many other features may be varied within the scope of my invention. The rods 32 are provided with spaced indications and preferably with numerals at least from 1 to 9, or as may be desired for use under particular circumstances and the rods are held in linearly adjusted position by spring pressed detents 33 which may act either frictionally or positively on the rods.

The plug 30 is fixed in the casing and supports a plunger 34 which is movable endwise for operating trip 26. The plunger is normally held against movement by detents 35 which are each urged down upon shoulders 35' by springs 35'' located between plungers 36 and screw plugs 37.

The rods 32, or as many of them as may be needed, are adjusted in accordance with the price of an article in the corresponding chute and the apparatus is then ready for use. The merchandise is in sight but the dispensing means can only be operated by means of a key 20, and the keys are each secured to a basket 29a by some such means as a chain 38, a permanent connection being desirable to prevent accidental or intentional abstraction of keys.

Details of the keys are shown in Figs. 4, 5, 6, 9 and 10. Each key preferably has a handle 39 and a body which is rectangular in section and which is movable only in a straight line in the passage provided by casing 19. At its forward end the key bears an unlocking device or key 40 (herein designated a cam-rod) which passes into the slot 34' of plunger 34 and has an upper cam edge to engage the under face of a detent 35 and move it upward until the line between the detent and its plunger 36 corresponds with the top line of plunger 34. Plunger 34 may be moved endwise by pressure transmitted by the end of unlocking rod 40 pushing directly against the face at 41 on the plunger but this is preferably done by so proportioning the parts that the front face of the abutment 42, which carries rod 40, strikes the left end face of the plunger 34 as the key 20 nears the end of its travel. The key has an opening at 43 which fits over the plug 30, both to insure registry of the cam rod 40 with the channel 34' in plunger 34 and also to insure registry of parts of the computing mechanism now to be described with the ends of rods 32 which actuate the computing mechanism.

The key is preferably formed as a hollow mechanism casing, as shown, and is provided with computing mechanism whose details are largely conventional, although special arrangements thereof are new. Obviously a mere counting mechanism may be substituted in some cases for the adding mechanism shown. There are two calculating devices of which the rear one is a customer's totalizer, intended to be reset after each customer has settled his account, while the other is an auditor's record, to be reset only after the day's transactions have been passed upon by the proprietor or manager of the store.

The customer's totalizer comprises shafts 44 and 45, shaft 44 bearing number wheels 46 which can be inspected by the cashier through peepholes at 47 (Fig. 4). Shaft 44 also carries pinions 48 for turning said number wheels, the pinions being operated by racks 49, reciprocated in guides 50 on the floor of the compartment in key 20, the racks being moved to the left by engagement at their ends with the right hand ends of rods 32, and the positions of the rods 32 determining the amount of rotation of the corresponding number wheels. Springs 51 are respectively connected at one end to the front wall of the casing of key 20 and at the other end to a rack 50, the return movement of the racks being determined by stop pins 52 striking against guides 50'. In the present embodiment of the invention the number wheels are rotated during the return movement of the racks, as the movement of the wheels due to the action of springs 51 is more smooth and even than if it were produced by endwise movement of the key 20. This is illustrated in Figs. 9 and 10 where the pawl 53 slips past the teeth on the interior of the number wheel in moving clockwise but grips the teeth on counterclockwise movement. Shaft 45 is a part of the ten transfer means, operating conventionally through parts at 55 and 56. The customer's totalizer is reset by means of a key inserted transversely of the casing at 57 and acting through a pinion 58 to zeroize this totalizer.

The auditor's totalizer is concealed under a removable panel 59 held in place against removal by means of a lock 60. This totalizer comprises a shaft 61 carrying rotary number wheels 62 which are also turned by racks 49 acting on pinions 63 and similar to those on shaft 44. A tens transfer shaft 65 coacts with the number wheels 62 and the totalizer may be reset by the auditor through any suitable means such as known in the art.

In operation, the key 20, which is about one-third the size of the drawings in Figs. 3 to 5, is inserted into any of the casings 19 (all keys being interchangeable for any of the dispensing devices) whereupon the racks strike the respective rods 32 as the key moves inward and so adjust the racks to actuate the number wheels, the cam-rod 40 also entering the slot in plunger 34 so as to raise the detents 35 and unlock the plunger. They key 20 moves a small distance (say three-eighths of an inch) after the racks have been adjusted for registering the cost of the article, this last increment of movement pushing the plunger outward to move trip 26, thus releasing detent 24 and so the separator to permit an article to pass out of the chute. Thereafter the same operation may be carried out at any other chute until the customer has completed his purchases, when he has only to show his key to the cashier to determine the amount of his indebtedness.

In the modified form of the invention shown in Figs. 12 to 16, a chute 70 is provided for packages, such as shown at 71, which may be invisible to the customer except for a portion of a package at the front end of the chute. As it is desirable that the customer shall have a chance to examine the package, as for reading labels on its periphery, I provide a closed casing 72 having at its upper end a compartment of a size suitable to hold a package, which stands on a rotary table 73 that projects out of the front of the casing, as shown in Figs. 12 and 15, so that the customer can rotate the table and examine the entire periphery of the package. The compartment may be composed of transparent material throughout if desired but preferably has only a window at the front, as at 74, to expose the package 75.

The casing 76' for receiving the key shown in detail in Figs. 3 to 5 has settable price rods 76 for actuating a calculating means such as shown for example in Figs. 3 to 5, and detents 77 for latching them in adjusted position. A rockarm 78 is connected to forks 79 extending under the head of each detent, whereby counterclockwise movement of arm 78 serves to lift all the detents and so to release the rods 76 for resetting. Each price rod has an upstanding arm 80 connected to a rack 81 coacting with a pinion 82 on a numeral wheel 83, so that endwise movement of a price rod rotates the numeral wheel corresponding thereto and thus the numeral wheels indicate the price of articles to be dispensed. Apertures at 84 in a frame member enable an operator to see numerals on the price rods which numerals correspond in their position to the numerals on the wheels 83, so that the clerk who sets the rods need not pass in front of the counter to verify the prices appearing on the indicator consisting of the wheels 83.

The plunger 85 for operating a trip or the like, as at 26 in Fig. 1, is like that of Fig. 8 but extends forward beyond the end of casing 76' and carries a pawl 86 for turning a ratchet 87 at the lower end of a shaft 88 (Fig. 12) that serves to actuate a counting device 89 for registering the number of times a key is inserted in the recess of casing 76'.

The plunger 85 also carries a pin 90 for rocking a lever 91 (Fig. 16) connected to a lever 92 by a linkage including a yielding element 93 to provide lost motion required in case the plunger 85 has a longer travel than that necessary for lever 92. A spring 94 urges the lever 92 towards an oscillatory disk 95 having a tooth 96 for engagement with a shoulder on the upper arm of the lever. The lower end of lever 92 is reduced to form a cam which first rocks a lever 97 against the tension of a spring 98 and then rides over a tooth 99 to lock the lever 92 in a position where its shoulder is out of reach of tooth 96.

The disk 95 is mounted on a shaft 100 provided with arms 101, 102 and 103, spaced about the axis of the shaft. The arms 101 normally hold back the packages in the chute, as in Fig. 12. When the shaft is moved clockwise (or counterclockwise in Fig. 16) by the weight of the packages upon release of disk 95 by lever 92 the arms 101 are raised to the position shown in Fig. 14 and the arms 102 pass down to a level where they obstruct the movement of the next package. As the weight of the packages is, or may be, considerable when the chute is full it is desirable to provide a retarder 104, here shown as pivotally supported above the second package. The retarder engages a following package and holds back all but the first and second, for example. Preferably it is arranged so that the arms 102 move it positively to holding position, as in Fig. 12, but to permit the weight to cause the third package, e. g., to move when the second advances to first place.

In order that no package may be released until after the key is inserted and withdrawn I provide a lever 105 with a hump at 106 projecting up through the floor of casing 76'. When the key is inserted it rides over the hump and forces the lever 105 down until its end is in the path of movement of arm 103, thus preventing release of any package. When the key is withdrawn the lever 105 is raised by a spring or by its own resiliency so as to free arm 103. Lever 92 being locked back by tooth 99, the shaft 100 is free to turn, whereupon the foremost package can roll out of the chute or can be withdrawn by the customer. As the shaft 100 rotates (toward the left in Fig. 16) a pin 107 strikes the curved upper portion of lever 97 and moves it to release the lever 92 from tooth 99. The front package 71 having moved out from under arms 101, the disk 95 and shaft 100 are free to turn backward. Such movement is effected by a spring 108 and the parts are again locked up in the position shown in Fig. 16.

When the last package has passed out of the chute a feeler 109, whose longer arm normally rests on the foremost package, is allowed to turn about its pivot, and its shorter arm then raises a rockarm 110 into a position where said rockarm prevents entry of the key until after the supply of packages has been replenished.

A ratchet 111 (Fig. 12) is provided for the purpose of preventing the key from being withdrawn after being inserted only part way. If the customer starts to buy and then changes his mind he is liable to cause a partial or total false entry on the key and associated parts. It is desirable therefore that every operation be completed. The customer who has thus been made to purchase undesired goods can subsequently turn them in to the cashier and receive an appropriate refund.

It will be obvious to those skilled in the art that various modifications may be made in my device without departing from the spirit of the invention, therefore I do not limit myself to what is shown in the drawings or described in the specification, but only as indicated in the appended claims.

Having thus fully described my said invention what I claim as new and desire to secure by Letters Patent is:

1. In a vending machine, means for supporting articles of merchandise in a stack, means for releasing a single article at the bottom of the stack, means settable in accordance with the price of such merchandise, a key for actuating said releasing means, and calculating means on said key constructed and arranged for actuation by said settable means when the key is so actuated.

2. A device as in claim 1, said releasing means being arranged to be actuated by the act of inserting said key.

3. A device as in claim 1, said releasing means being actuated upon insertion of said key, and comprising a rotary element having fingers adapted to enter between successive articles so as to separate retained from released articles, and a detent for holding said element against rotation until released by said key.

4. In a vending machine, a chute, means at the bottom of said chute for releasing an article in the chute, a horizontally extending passage below said chute, a reciprocable plunger at the inner end of said passage, locking means for said releasing means operated by said plunger, a key adapted to enter said passage and to actuate said plunger for releasing said locking means, rods in said passage parallel to said plunger and adjustable according to the price of the articles to be dispensed, and calculating means on said key operable by said rods during entry of said key.

5. A device as in claim 1, said releasing means being actuated upon insertion of said key, and comprising a rotary element having fingers adapted to separate retained from released articles, and a step-by-step holding means for said rotary element.

6. In a vending machine, a chute, means at the bottom of the chute for releasing an article in the chute, a horizontally extending passage below said chute, a reciprocable plunger at the inner end of said passage, locking means for said releasing means operated by said plunger, a key adapted to enter said passage and to actuate said plunger for releasing said locking means, said key including computing means, and means in said passage for actuating said computing means, said actuating means being settable in accordance with the price of said articles.

7. In a vending machine, means for supporting merchandise, means for releasing such merchandise in predetermined amount, means settable in accordance with the price of such merchandise, a key for actuating said releasing means, calculating means on said key constructed and arranged for actuation by said settable means when the key is so actuated, said settable means comprising rods slidably mounted in a fixed support, said rods having spaced price indications thereon, and means for securing said rods in adjusted position.

8. In a vending machine, means for supporting merchandise, means for releasing an article of merchandise, means settable in accordance with the price of such merchandise, a key for actuating said releasing means, calculating means on said key constructed and arranged for actuation by said settable means when the key is so actuated, said settable means comprising rods slidably mounted in a fixed support, said rods having spaced price indications thereon, means for securing said rods in adjusted position, and said releasing means comprising a plunger movable parallel to said rods.

9. In a vending machine, means for supporting articles to be sold, releasing means therefor, a passage in said supporting means, and a key operable by a right-line movement in said passage to actuate said releasing means, said key including adding means, and means on said machine adjacent said passage for actuating said adding means during said right-line movement.

10. In a vending mechanism, a cabinet for supporting articles to be sold, releasing means for an article, a passage in said cabinet, a key operable by a right-line movement in said passage to actuate said releasing means, computing means on said key, and said mechanism including price-indicating means for actuating said computing means upon entry of said key into said passage.

11. A device as in claim 10, said computing means including reciprocatory racks, said price-indicating means comprising rods settable in fixed adjusted position in said cabinet, and a guide rod on said key coacting with guiding means parallel to said rods for insuring linear register of said racks and said settable rods in operation.

12. In a vending machine, means for supporting merchandise, means for releasing an article of merchandise, means settable in accordance with the price of such article, a key for actuating said releasing means, calculating means on said key constructed and arranged for actuation by said settable means during right-line movement of said key, and counting means operated upon each insertion of said key during such right-line movement thereof.

13. In a vending machine, means for supporting merchandise, means for releasing an article of merchandise, means settable in accordance with the price of such merchandise, a key for actuating said releasing means, calculating means on said key constructed and arranged for actuation by said settable means when the key is so actuated, adjustable means adjacent the point of delivery of merchandise for indicating the price of articles in said supporting means, and means interconnected with said settable means and said price indicating means for altering the price indicated as said settable means is adjusted.

14. In a vending machine, means for supporting merchandise, means for releasing an article of merchandise, means settable in accordance with the price of such merchandise, a key for actuating said releasing means, calculating means on said key constructed and arranged for actuation by said settable means when the key is so actuated, and means for preventing use of said key when the merchandise is exhausted.

15. In a vending machine, means for supporting merchandise, means for releasing an article of merchandise, means settable in accordance with the price of such merchandise, a key for actuating said releasing means, calculating means on said key constructed and arranged for actuation by said settable means when the key is so actuated, and means preventing release of such merchandise until after the key has been withdrawn.

16. In a vending machine, means for supporting merchandise, means for releasing an article of merchandise, means settable in accordance with the price of such merchandise, a key for actuating said releasing means, calculating means on said key constructed and arranged for actuation by said settable means when the key is so actuated, price-indicating means adjacent to the delivery point for the merchandise and visible through a window at the delivery side of the container, and connections from said settable means to said price-indicating means for automatically varying the price indication in accordance with alterations in said settable means.

17. In a vending machine, means for supporting merchandise, means for releasing an article of merchandise a keyway adjacent thereto, means settable in accordance with the price of the merchandise, a key adapted to be entered in the keyway for actuating said releasing means, calculating means on said key constructed and arranged for actuation by said settable means when the key is so actuated, and means in connection with said keyway for preventing use of the key when the container is empty.

18. A device as in claim 17, said last-named means including a feeler for engagement with the merchandise in the container, a stop mounted adjacent said keyway, and means arranged to move said stop into the path of said key in the keyway when the container is empty, so as to prevent entry of the key into the keyway.

19. In a vending machine, means for supporting articles to be sold, releasing means therefor, a passage in said supporting means, a key operable by a right-line movement in said passage to actuate said releasing means, counting means on said key, and means operable by said key during such right-line movement for actuating said counting means.

20. In a vending machine, means for supporting merchandise, comprising a container, means for releasing an article of merchandise and delivering it at the front of said container, said container having a keyway adjacent the delivery point for such article, means in connection with the keyway and settable from the rear of the casing in accordance with the price of the merchandise in the container, a key adapted to be entered in the keyway for actuating said releasing means, calculating means on said key for actuation by said settable means when the key is so entered, a window at the delivery side of the container, price indicating means visible from the front of the container through said window only connections from said settable means to said price-indicating means for automatically varying the price indication in accordance with alteration in said settable means, and markings on said settable means visible to a clerk at the rear of the casing.

21. In a vending machine, means for supporting merchandise, means for releasing an article of merchandise, means settable in accordance with the price of such article, a key for actuating said releasing means, and calculating means on such key constructed and arranged for actuation by said settable means during right-line movement of said key.

SAM ESGRÓ.